United States Patent [19]
Cheney

[11] 3,779,572
[45] Dec. 18, 1973

[54] CONVERTIBLE SNOW VEHICLE TRAILER

[76] Inventor: Stanley O. Cheney, Rt. 114 North, Bradford, N.H. 03221

[22] Filed: Sept. 24, 1971

[21] Appl. No.: 183,439

[52] U.S. Cl. ............................ 280/21 R, 280/24
[51] Int. Cl. ........................................ B62b 13/08
[58] Field of Search ............... 280/21 R, 16, 12; 180/5 R; 9/310 B

[56] References Cited
UNITED STATES PATENTS

| | | | |
|---|---|---|---|
| 3,671,055 | 6/1972 | Aarup | 280/87.01 |
| 1,459,263 | 6/1923 | Rogers | 280/21 R |
| 3,438,074 | 4/1969 | Goyen | 9/310 B |
| 2,770,817 | 11/1956 | Woodworth | 9/310 B |
| 2,510,798 | 6/1950 | Cahill | 280/87.01 |
| 3,510,144 | 5/1970 | Casadi | 280/21 R |
| 3,591,193 | 6/1971 | Mitchell | 280/16 |
| 3,380,090 | 4/1968 | Kenmuir | 9/310 B |

Primary Examiner—Robert R. Song
Attorney—Theodore C. Browne

[57] ABSTRACT

This trailer especially designed for use with snowmobiles, has a bottom surface portion which rides in direct contact with the snow. The bow portion curves upwardly. A front-mounted ski having a tiller causes the trailer to be steerable. A cockpit surrounded by a flotation collar permits the trailer to be used as a boat and be towed, or sailed on the water. Wheels are provided to allow the trailer to be used on land.

6 Claims, 8 Drawing Figures

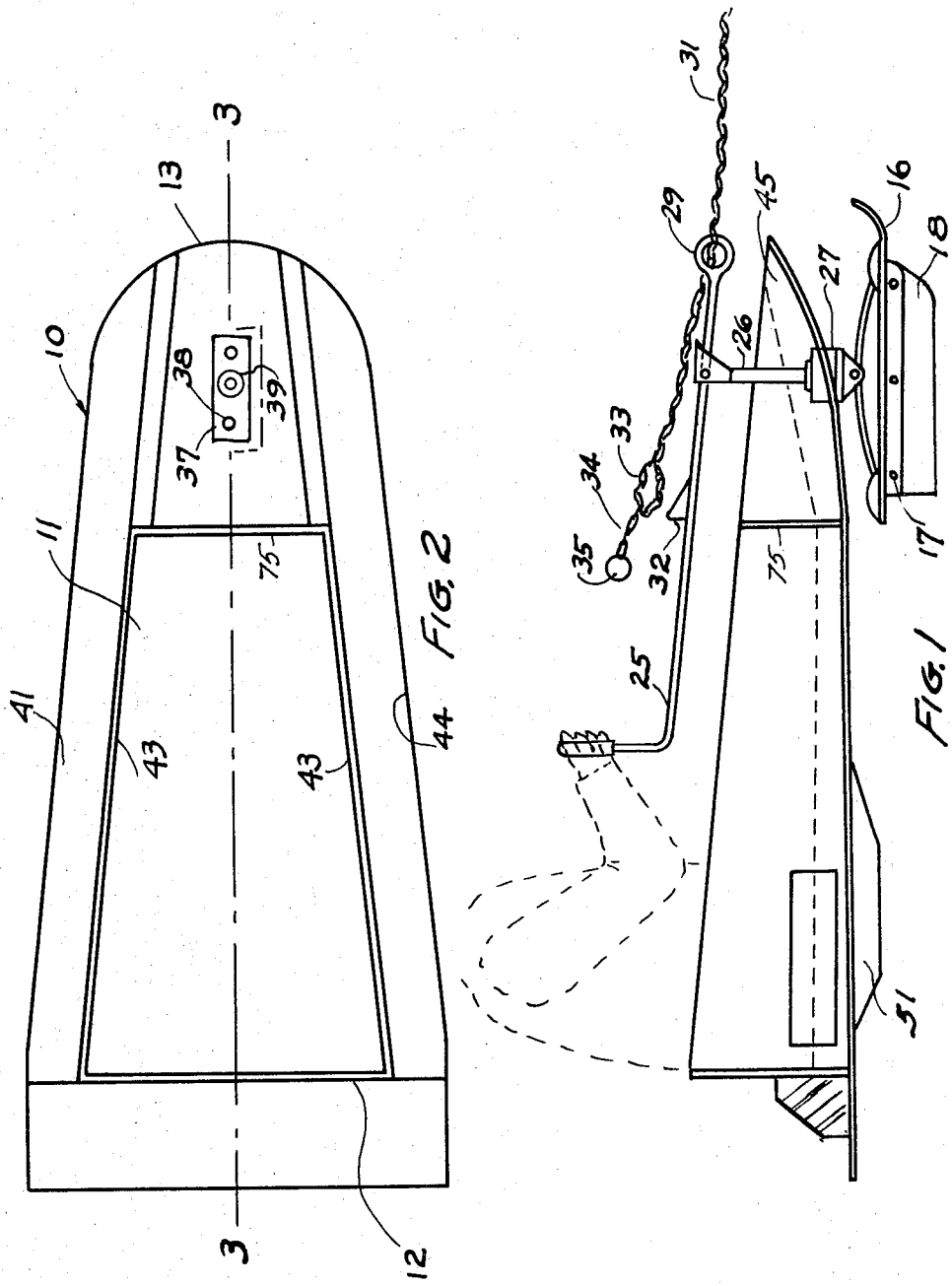

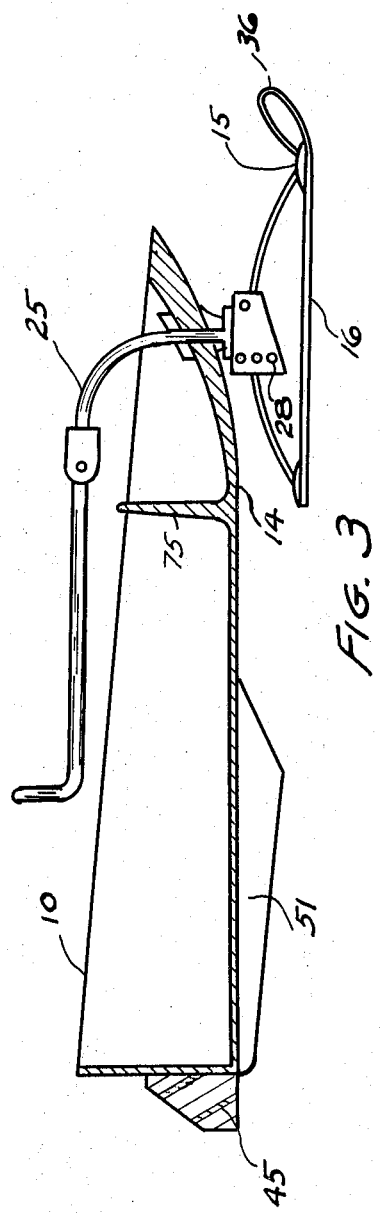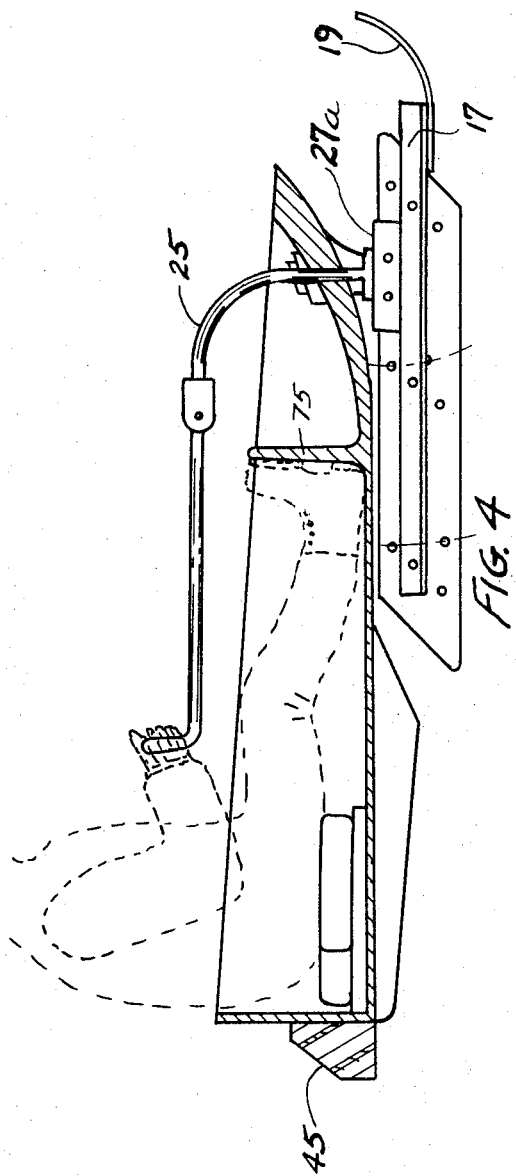
STANLEY O. CHENEY INVENTOR
BY Theodore C. Browne
ATTORNEY

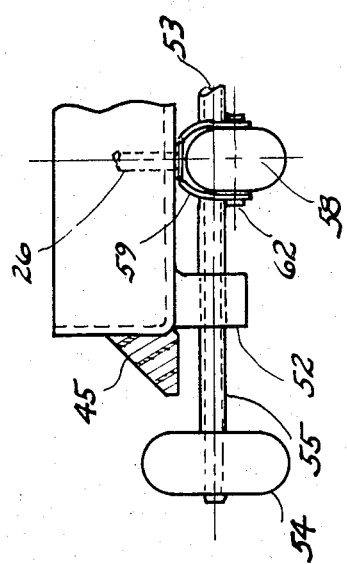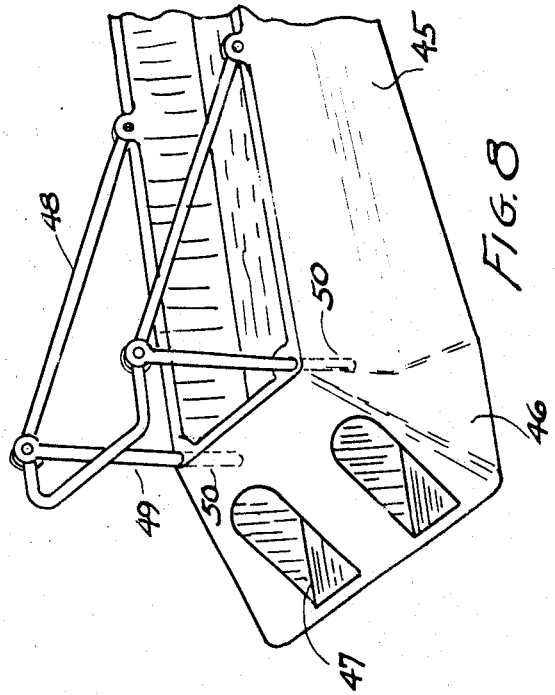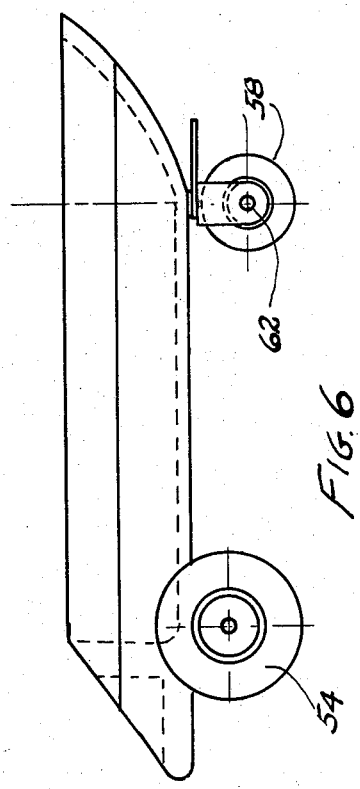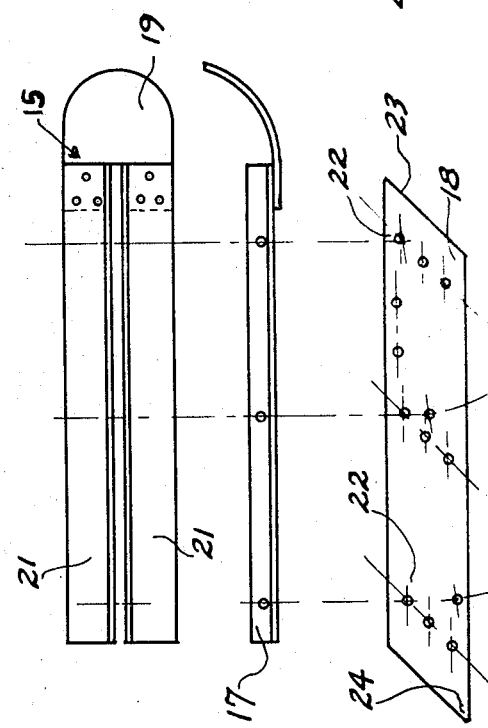
STANLEY O. CHENEY INVENTOR
BY Theodore C. Browne
ATTORNEY

CONVERTIBLE SNOW VEHICLE TRAILER

This invention relates to a towable vehicle which, although primarily designed as a trailer for snowmobiles, can be pulled behind a boat in the manner of a water ski, or with simple change parts, can be used as a wheel trailer and pulled by any suitable means.

Trailers which are designed to be pulled by snow vehicles presently are adaptations of sleighs or, more commonly, the one-horse cutter. The trailer bodies are attached to a runner rig usually some 6 to 10 inches high. With such trailers, if the snowmobile takes too short a turn one of the runners cuts deeply into the snow. The trailer then rolls to its side and, if the turn continues, will upset. This happens despite a swivel jointed towbar.

In wooded or rocky country, trailer upsets can be serious. The passenger can hit a tree, a stump, or a rock; the crusty snow, when hit at 20 – 25 miles an hour, can cause painful cuts and scrapes.

Another serious difficulty associated with snow-vehicle trailers, whether they are towed by a towbar or by a rope, is that the rider in the trailer has no control over its direction. The noise of these vehicles makes communication between the rider and the driver difficult to impossible. Often a rider finds himself swung into various obstacles which he has no power to avoid.

The objects of the present invention are: to produce a trailer for snow vehicles in which possibility of upset is greatly reduced; to produce a trailer which, to a substantial degree, may be steered by its passenger and thus avoid many collisions and accidents; to produce a trailer which is readily converted to a small boat which may be towed, and to provide for the conversion of the trailer hull to a small land vehicle to be drawn by any suitable means. How the device accomplishes these functions will appear from the specification, and from the drawings in which FIG. 1 is a sectional elevation of the improved trailer, showing the tiller, hinge, and quick release mechanism for casting off a tow rope or flexible towbar;

FIG. 2 is a top plan view;

FIG. 3 is a vertical section on the line 3—3 of FIG. 2;

FIG. 4 is a sectional view of the snow vehicle trailer showing the adjustable fin. (The position of a rider is shown in dotted outline);

FIG. 5 is an exploded view of the dirigible ski and the adjustable fin;

FIG. 6 shows the axle supports and wheels which adapt the trailer for land use;

FIG. 7 is a transverse partial section through the front of the vehicle; and

FIG. 8 shows a conversion allowing the vehicle to be used in the manner of a dog sled.

I have found that if upset of a snowmobile trailer is to be avoided, the hull of the trailer should run directly in contact with the surface of the snow. Although a trailer with parallel sides will resist upset to a marked degree, if the trailer is to possess the maximum resistance to flipping when the towing vehicle changes direction quickly, the stern of the trailer should be considerably wider than the bow.

Referring to the drawings, as is shown in FIG. 2, the hull, 11, of the trailer, 10, is A-shaped, and preferably terminates in a square stern, 12. The bow, 13, is curved horizontally. The curve adds to the appearance of the vehicle, but a square bow can be made to operate properly.

As shown in FIG. 3, the trailer rides on the snow in a horizontal position, ir at a slight angle of attack. The portion, 14, of the bow of the hull, about one-third of the length of the trailer, 10, sweeps upwardly some 3 – 5 inches. Not only does the upward sweep of the hull bottom give clearance for the dirigible ski or rudder, 15, but it prevents the prow of the trailer from diving under crusted snow or into the water.

The rudder, 15, comprises a metal ski, 16, which may be sprung (FIGS. 1 and 3) or unsprung (FIG. 4), equipped with two opposed angle bars, 17—17 (FIGS. 4 and 5), which are bolted or otherwise fastened to the ski, 16, in such a manner that a fin, 18, may be fastened between the two vertically directed parallel legs of the bars, 17—17.

If the ski, 16, is solid and equipped with the angle bars, 17—17, then a number of fins, 18, are furnished in different widths. If the trailer is to be operated over crusty snow or ice, the width of the fin should be from 1 – 2 inches. On wet snow, the fin should be approximately 3 inches wide, and for dry and fluffy snow, the fin should project from 4 – 5 inches below the ski. Adjustability of a single fin is a considerable advantage. This is accomplished by providing that the steering means should have a ski-shaped nose section, 19, with a bifurcated tail or runner portions 21—21, adapted to hold the fin, 18, between the two tail portions, 21—21 (see FIG. 5).

The fin itself is a flat plate which may be made of any rigid material. It bears a number of holes, 22—22, located in such a manner that the fin, 18, may be attached to the rudder, 15, in a number of vertical positions, and angular positions as well.

Snow has very variable densities and varied surface conditions. For maximum control in very light and fluffy snow, the fin, 18, is dropped to its lowermost position so that the lateral control of the trailer will be maintained. As the snow increases in density, it is not necessary to have so much rudder, and the fin, 18, may be attached in a position that will not cause it to project beneath the ski to so great a distance. Sometimes it will be advantageous to raise the nose, 23, of the fin, 18, and drop its tail, 24. This is an advantage if the snow is crusted with ice, is wet, packed, or of high density.

Steering is secured by a tiller, 25, which is hinged on the steering spindle, 26. The spindle, 26, in turn is rigidly fastened to the attachment block, 27 (FIG. 1), which provides the sprung connection, or to an attachment block, 27a, when the rudder is unsprung. Advantageously, block, 27, may be adapted to hold the ski, 16, at varied angles of attack by boring the holes, 28—28, adjacent the rear margin of the block. By attaching the ski, 16, to the block, 27, by bolts passing through the appropriate holes, the attitude of the ski may be changed from horizontal to an upward angle of attack. Preferably the tiller, 25, should have a towing extension directed towards the bow, 13, terminating in an eye, 29, as shown in FIG. 1. Spindle, 26, should be just high enough to allow towing line, 31, to clear the bow, 13. A small triangular block, 32, welded to the tiller, 25, to the rear of the steering spindle, 26, receives the end loop, 33, of the tow line, 31. A cord, 34, with a ball grip, 35, is fastened into the splice. Thus by pulling on the ball grip, 35, the loop, 33, lifts off the block, 32, slides through the eye or pull ring, 29, on the tiller handle and the trailer is cast free.

Other means of towing are also possible. The trailer can be pulled from the eye or handle loop, 36, fashioned on the end of the ski, and may also be pulled by a towbar fastened at any convenient place of attachment to the hull. The towbar should be provided with a swivel joint.

The weight of the passenger changes the attitude of the trailer. As FIG. 2 shows, the plate, 37, through which the steering spindle projects, is provided with at least three holes, 38—38, each adapted to receive the steering spindle bearing, 39. With three or more possible positions in which to place the steering spindle, 26, attitudes which keep the ski or the rudder fully effective can be established and the trailer can be adapted to a considerable range of body weights. Vacant positions in the plate are closed by plugs or other convenient means.

The forward extent of the cockpit is delimited by upstanding transverse wall means 75 (FIGS. 1-4) shown positioned for engagement by the trailer occupant's feet to limit his forward movement relative to the trailer, especially upon deceleration.

In an open snow field this trailer towed behind a snow vehicle can be swung back and forth across the "wake" of the vehicle very much in the manner of a water ski. In fact, by holding the tiller well over it is possible to swing the trailer so far to the left or right of the towing vehicle that the trailer and snowmobile will travel in nearly parallel paths.

As FIG. 1 and the plan view, FIG. 2, show, the bottom of the hull extends beyond the wall of the cockpit some 3 or more inches. The extension, 41, between the walls, 43—43, of the cockpit and the margin, 44, of the floor of the hull is built up with a foamed flotation substance. This flotation collar, 45, can be any substance that dependably adds buoyancy to the hull, but preferably is made of foamed polystyrene or other foamed resinous substance, e.g., polyurethane.

To prevent a "rooster tail" of snow from falling on the rider, particularly when exposed to cross or following winds, the stern of the trailer can, with considerable advantage, extend much further than do the side arrangements outside of the cockpit. In water, a 6 – 18-inch tail extension is recommended. The width depends upon the rider's weight. It may be a detachable piece.

In another form of a detachable extension, 46 (FIG. 8), steps, 47, may be molded in the stern portion. With the addition of a fold-down handle, 48, supported on struts, 49—49, hinged to the handle, 48, and fitted into sockets, 50—50, formed in the detachable stern extension, 46, the trailer can be ridden in the manner of a dog sled. The body of foam all around the exterior is covered with an impervious coating, preferably a resin filled fabric, but a thorough coating of a water-proof epoxy or water-proof polyester finish is also suitable. As a consequence, the trailer can be launched in water and will float easily. It will, with stern extension, 46, or smaller detachable extensions, support a reasonably heavy person. The hull can be made of plywood, plywood faced with a hard plastic, metal, or glass fibres reinforced by resin, the so-called "fiber-glass" construction.

When used as a boat, the fin may be considerably deeper, or even be shaped like a conventional boat keel. However, the fin, which is useful in snow, set to its deepest position will usually be found to be satisfactory. Swinging the rudder from side to side as the craft (now a little boat) is being towed will cause the craft to swing across the wake of the motor boat, and behave in most respects as does a water skier riding first to one side of the wake, then to the other.

The device may be converted to a small cart by removing the two narrow blocks or runners, 51—51, which are fastened on the outside of the hull and give considerable lateral stability when the trailer is traveling over the snow. They can be removed by loosening their attachments, and are replaced by axle blocks, 52—52, which attach to the hull through the bolt holes. Blocks, 52, which are bored to receive axle, 53, are substituted. Wheels, 54—54, are maintained beyond the margin of the hull by spacer sleeves, 55.

The conversion is completed by removing the ski, 16, and substituting a pilot wheel, 58. This may have its own yoke, 59, and spindle, 26, but it can be supported by plates bolted to each side of the ski support block, 27. Yoke, 59, or the plates are bored to receive the short axle, 62.

Usually, when used as a land vehicle, the device is towed by a swivel towbar. This has a forked end constituting a yoke, the arms of which may be attached to the ski support block, 27.

The device has been towed both in open country and along woodland trails in various snow conditions. It has remained at all times under the control of the rider. It is safe, free from upsetting, and is useful not only in the ski season but at all other times of the year.

We claim:

1. A trailer designed for towing for instance, by a snowmobile, said trailer comprising:
   a. wall means defining a unitary hull having a generally flat bottom, a stern disposed at least 6 inches forwardly of the rearmost extent of the flat bottom, left and right sidewalls extending from the stern forwardly and toward one another to provide a generally pointed bow, said flat bottom curving upwardly in said bow, and transversely extending upstanding foot engaging means disposed within the hull rearwardly from the foremost extent of the bow;
   b. means defining an opening down through the flat bottom in the upwardly curving portion thereof forwardly of said foot engaging means, said opening being disposed on the longitudinal center line of the hull;
   c. a steering spindle removably journalled for rotation in said opening and extending downwardly and upwardly from said opening;
   d. a tiller extending rearwardly from the steering spindle over and rearwardly past the foot engaging means;
   e. block means mounted on the steering spindle below said flat bottom upwardly curving portion, said block means having adjustable means thereon for mounting running surface engaging means at varied positions relative to the hull;
   f. running surface engaging means adjustibly mounted to said block by said adjustible means; and
   g. hitch means mounted on said trailer and disposed for permitting the trailer to be towed forwardly across the running surface.

2. The trailer of claim 1 wherein the running surface engaging means is constituted by ski means for engaging snow.

3. A convertible trailer designed for towing behind snow vehicles, motor boats, and land machines, having in combination:
   a. a hull comprising a bottom portion adapted to run directly on the surface of the snow,
   b. an upward curving bow portion,
   c. a cockpit of lesser width and length than the said bottom portion attached to the said portion inwardly from its margins,
   d. a steering spindle located on the center line of the vehicle in the said bow portion,
   e. a ski;
   f. a block for the attachment of steering means attached to the lower end of the said spindle, said block being provided with plurality of holes adjacent the rear margin thereof and wherein a pivot hole is formed adjacent the forward margin of said block pivot means pinning the ski to the block through the pivot hole and adjustable securement means pinning the ski to the block through selected ones of said plurality of holes whereby the vertical angle of the ski attached to said block may be adjusted to present varying angles of attack.
   g. a tiller attached to the upper end of said spindle,
   h. a floatation collar of a foamed substance attached to and surrounding the outer walls of said cockpit and the said bottom portion, and
   i. means attached to the said trailer to permit towing by powered means.

4. The trailer as claimed in claim 3 wherein the width of the vehicle at its stern is much wider than the width of the bow portion, whereby the resistance of said trailer to flipping and upset is improved.

5. The trailer as claimed in claim 3 wherein the lower surface of said bottom portion is provided with a plurality of runners to increase the lateral stability of said towed vehicle.

6. The trailer as claimed in claim 3 wherein the said stern portion of the bottom extends from 6 – 18 inches beyond the rear wall of the cockpit.

* * * * *